Aug. 9, 1960 J. GOLDSTEIN 2,948,334
VENTILATED SEAT CUSHION
Filed April 22, 1959
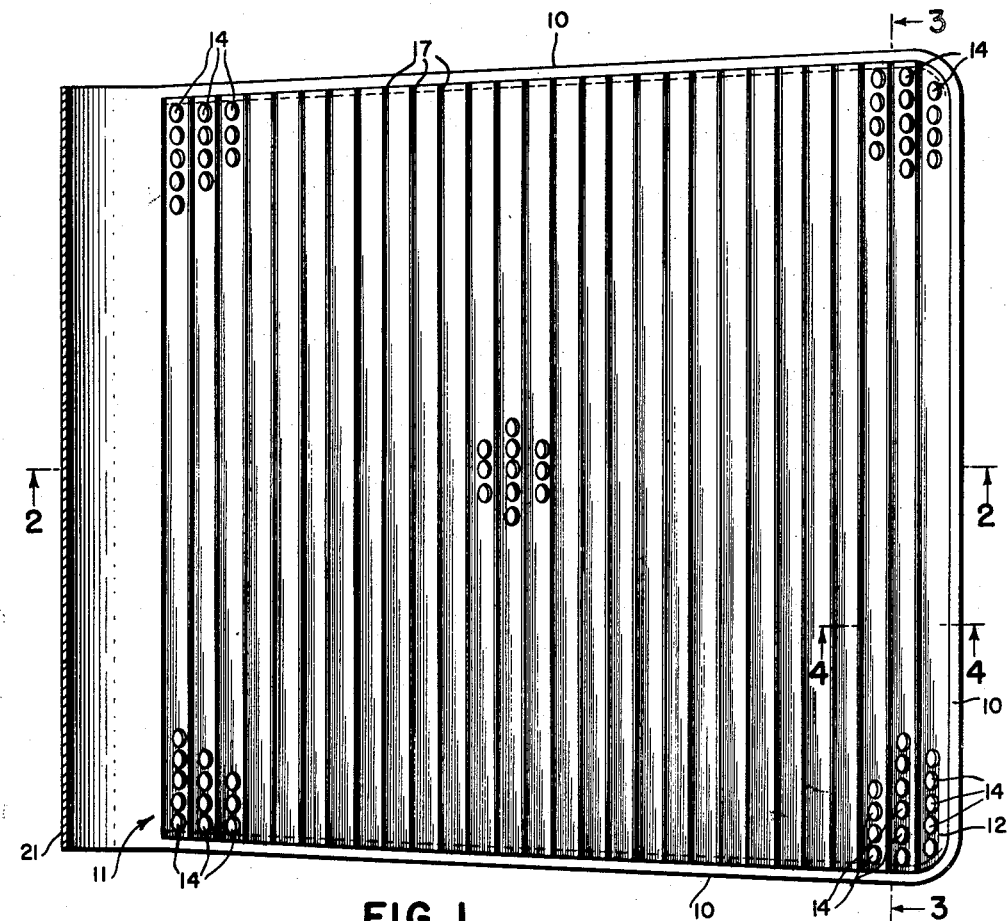
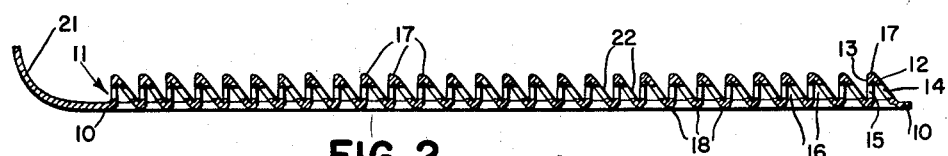
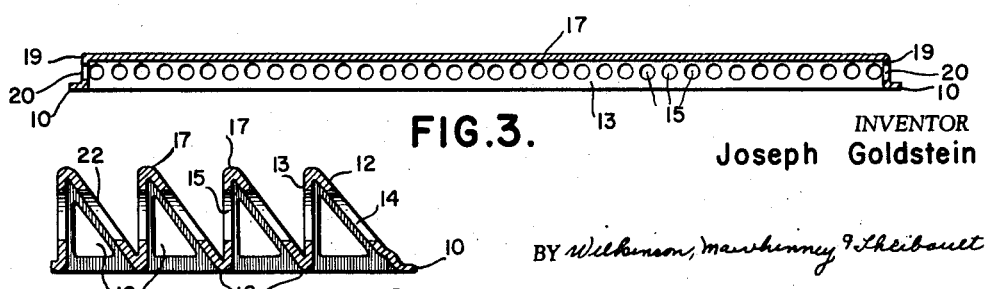
INVENTOR
Joseph Goldstein
BY Wilkinson, Mawhinney & Theibault
ATTORNEY United States Patent Office 2,948,334
Patented Aug. 9, 1960

2,948,334
VENTILATED SEAT CUSHION
Joseph Goldstein, 343 Bloomfield Ave., Verona, N.J.
Filed Apr. 22, 1959, Ser. No. 808,210
3 Claims. (Cl. 155—182)

The present invention relates to a ventilated seat cushion, and has for an object to provide such a cushion applicable to automobile, furniture or other seats for the purpose of adequately supporting persons and at the same time supplying cooling air to the body of the person contacting the cushion.

Another object of the invention is to provide a ventilated seat cushion in which a minimum of surface contact is made with the person of the occupant while involving no discomfort, but on the other hand promoting ease and comfort during occupancy as well as the furnishing of cooling air to the area of support.

A further object of the invention resides in providing a ventilated seat cushion which may be made of a plastic or synthetic resin molded integrally and possessing characteristics both of rigidity and elasticity which will yieldably support the occupant without such collapse as would interfere with the functioning of the ventilation and which, at the same time, is highly resistant to cracking or rupturing of the plastic material.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view of a ventilated seat cushion constructed in accordance with the present invention;

Figure 2 is a longitudinal central sectional view taken on the line 2—2 in Figure 1;

Figure 3 is a transverse sectional view taken on the line 3—3 in Figure 1, and

Figure 4 is a fragmentary and elevational view partly broken away, showing a single form of the invention.

Referring more particularly to the drawings, 10 designates a marginal base flange which extends outwardly all around from a cushion body 11 which in the main is composed of supporting members each comprising generally front and rear walls 12 and 13.

These walls 12 and 13 have suitable apertures or perforations 14 and 15 which communicate with internal air or ventilating channels 16 embraced within the walls 12 and 13.

The walls 13 are preferably substantially vertical, considered relatively to the position of use of the seat cushion, while the walls 12 are diagonal or sloping from the base upwardly toward the upper ends of the walls 13. Accordingly, the supporting members in cross section are in effect right angle triangles and the supporting members as a whole extending across the seat cushion are in effect triangular prisms with the upper portions truncated in that walls 12 and 13 do not meet in an upper vertex, but rounded or curved crown portions 17 connect the upper ends of the walls 12 and 13 and constitute the contact area between occupant and cushion. These crowns run in substantial parallel lines either transversely of the cushion or longitudinally thereof. As a matter of fact these parallel spaced crown portions 17 may be arranged diagonally of the cushion or in any other desired orientation.

The lower ends of the opposed walls of adjacent supporting members are merged into reinforcing ribs 18 which preferably lie in the plane of the marginal base flange 10 and constitute therewith the base of the mat or cushion formed by the cushion body.

As shown more particularly in Figure 3, end walls 19 may also be supplied at opposite ends of the ventilating channels 16 and these walls will preferably also have air admitting or exhausting apertures or perforations 20.

A hinge member 21 may be also molded in one piece with or connected to the rear end of the seat cushion for the purpose of attaching a back cushion thereto, this back cushion being formed similarly to the seat cushion or otherwise as commercial demands dictate.

In the manufacture of the device, it is preferred that the entire seat cushion including both base and cushion body be molded from a suitable plastic or synthetic resin having a high factor of tensile strength to impart rigidity and resistance to collapse, particularly in the supporting members; and at the same time to embrace a measure of elasticity or resiliency which will impart a resistance to cracking or fracture while enabling the supporting members to yield within limits under the weight of the person occupying the cushion but not to an extent to close the ventilating apertures or in any way interfere with the free flow of cooling air into the internal parts of the cushion. As an example of a plastic having these characteristics, one of the polyethylene family of plastics may be employed although the invention is not limited to any particular material.

In the use of the device, the crown portions of the supporting members will support the person of the occupant at spaced points allowing cooling air to flow into the spaces 22 between adjacent supporting members, which spaces are open at the sides of the cushion. The ambient atmospheric air is also permitted to freely flow through the ventilating apertures 14 and 15 and thus supply ventilation to the channels 16 and to the spaces 22 between the supporting members, which spaces are made possible by the sloping of the walls 12. In this way ample support through a minimum of contact area is provided for the occupant of the cushion and a very complete vigorous movement of cross ventilation through the apertures 14 and 15 in a direction longitudinally of the seat and through the spaces 22 between the supporting members transversely of the seat.

Although I have disclosed herein the best form of the invention known to me at this time, I reserve the right to all such modifications and changes as may come within the scope of the following claims.

What is claimed is:

1. An integral ventilated seat cushion of molded plastic material comprising a series of longitudinally extending supporting members, each said member being generally triangular in transverse cross-section and having a first substantially vertically extending wall and a second sloping wall, a curved integral crown portion joining the upper margins of said walls and constituting the contact area between each said member and a person seated thereon, the lower margin of the sloping wall of one member being integrally joined to the substantially vertical wall of the next adjacent member, and a plurality of apertures extending through each of said walls, whereby said seat cushion may be integrally molded of plastic material, and will provide for ventilation therethrough.

2. The seat cushion of claim 1, the lower margins of said walls being coplanar and defining parallel supporting ribs.

3. The seat cushion of claim 1, said members having openings at their opposite ends to permit access of air to the space beneath each said member.

References Cited in the file of this patent

UNITED STATES PATENTS

| | | |
|---|---|---|
| 2,223,861 | Wagner | Dec. 3, 1940 |
| 2,620,862 | Hite | Dec. 9, 1952 |
| 2,768,924 | Wright | Oct. 30, 1956 |
| 2,807,809 | Kotterman | Oct. 1, 1957 |